United States Patent [19]
Weinstein et al.

[11] Patent Number: 5,483,793
[45] Date of Patent: Jan. 16, 1996

[54] INFRARED RADIATION SUPPRESSION DEVICE

[75] Inventors: Barry Weinstein; John M. Koshoffer; Roy E. Moyer, all of Cincinnati, Ohio

[73] Assignee: General Electric Company, Cincinnati, Ohio

[21] Appl. No.: 78,334

[22] Filed: Sep. 2, 1970

[51] Int. Cl.[6] .................. F02K 3/10; F02K 3/06
[52] U.S. Cl. .................. 60/261; 60/262
[58] Field of Search .................. 60/226, 262, 265, 60/266, 226.1, 226.2, 226.3, 261

[56] References Cited

U.S. PATENT DOCUMENTS

| | | | |
|---|---|---|---|
| 2,753,685 | 7/1956 | Mattinson | 60/226 |
| 2,999,672 | 9/1961 | Harshman | 60/262 |
| 3,009,318 | 11/1961 | Skoff | 60/226 |
| 3,048,376 | 8/1962 | Howald et al. | 60/262 |
| 3,210,934 | 10/1965 | Smale | 60/265 |
| 3,377,804 | 4/1968 | Wright et al. | 60/262 |
| 4,335,573 | 6/1982 | Wright | 60/262 |

*Primary Examiner*—Stephen C. Bentley
*Attorney, Agent, or Firm*—Andrew C. Hess; David L. Narciso

[57] ABSTRACT

A gas turbine engine of the type generating a hot gas stream and a fan stream includes a mixer having upstream and downstream portions which define first and second chutes for efficiently mixing the streams prior to discharge through an engine nozzle. Means are provided to selectively communicate the downstream chutes with alternate ones of the upstream chutes to cool the downstream mixer portion and reduce the infrared radiation emissions from the nozzle.

8 Claims, 2 Drawing Sheets

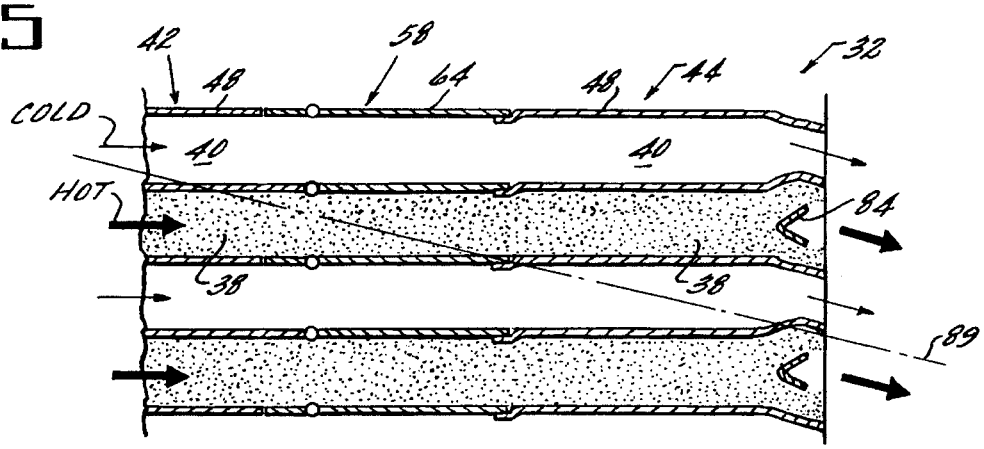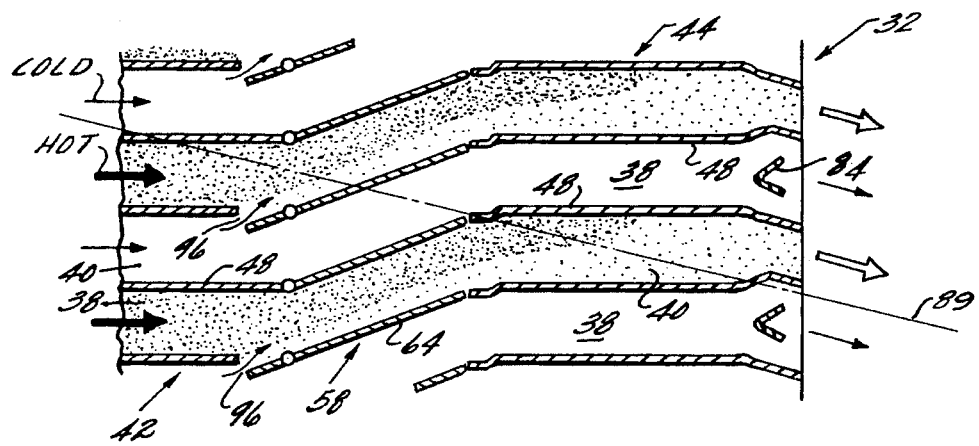

INFRARED RADIATION SUPPRESSION DEVICE

This invention relates to gas turbine engines and, more particularly, to means for reducing infrared radiation emissions therefrom. The invention herein described was made in the course of or under a contract, or a subcontract thereunder, with the United States Department of the Air Force.

In military aircraft gas turbine engines, it is highly desirable that infrared emissions from the engine nozzle be reduced to a practical minimum, at least on a selective basis, to avoid acquisition and tracking by heat seeking, hostile forces, or to permit effective countermeasures or evasive action to be taken against such forces.

A primary object of this invention is to provide a lightweight and reliable structure for mixing the hot gas and fan streams of a gas turbine engine and for selectively suppressing the infrared radiation emissions from the engine nozzle.

A further object of this invention is a flameholder arrangement for use with a mixing structure, as above, which permits selective cooling of the flameholder.

Yet another object of this invention is to provide a convoluted mixer and a flameholder arrangement which efficiently mixes the hot gas and fan streams of an afterburning turbofan engine and permits selective suppression of emitted infrared radiation.

Briefly stated, the above and other objects and advantages of the present invention are achieved in a gas turbine engine of the type adapted to generate an inner annular hot gas stream and an outer annular fan stream by providing a convoluted annular mixer for efficiently mixing said streams prior to discharge thereof through an engine nozzle, with the mixer comprising upstream and downstream portions defining an annular array of alternating first and second chutes and means for selectively communicating the downstream chutes with alternate ones of the upstream chutes, whereby the temperature of the downstream portion and, hence, the infrared radiation emitted therefrom may be selectively reduced. In one form, the selective communicating means comprises flapper valve means disposed intermediate the upstream and downstream mixer portions for selectively directing the efflux from the upstream mixer portion chutes to selective ones of the downstream mixer portion chutes.

A flameholder arrangement is provided for use with a mixer of the type described above and comprises generally radially extending V-gutters which join, at their inner and outer ends, respectively, an inner and outer annular V-gutter. The flameholder is connected to the downstream mixer portion with the inner annular V-gutter and the radial V-gutters arranged to normally be bathed in the hot gas stream, whereupon when the communication between upstream and downstream chutes is reversed, the flameholder is bathed in the relatively cool fan stream and its temperature greatly reduced.

While the specification concludes with claims particularly pointing out the subject matter of the present invention, it is believed that the invention will be better understood upon reading the following description of the preferred embodiments in conjunction with the accompanying drawings, wherein:

FIG. 5 is a cross-sectional view, like FIG. 3, schematically showing a further embodiment of the mixer of this invention in its first position; and FIG. 6 is a cross-sectional view, like FIG. 5, schematically showing the mixer in its second position.

Like reference numerals will be used in describing like elements in the following description of the preferred embodiments.

Figure 1:
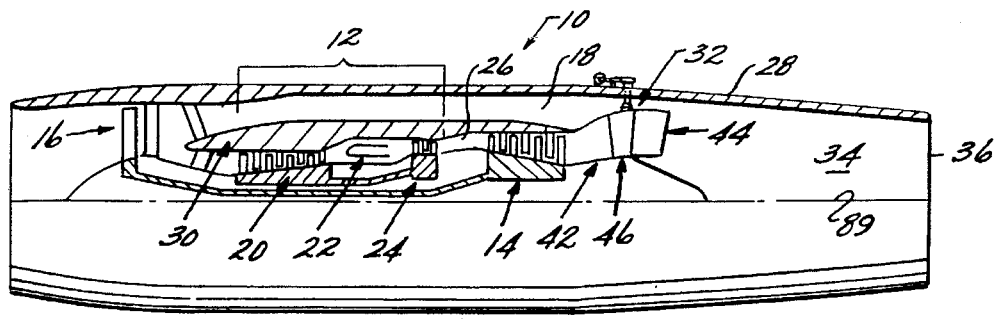
FIG. 1 is a side elevational view, in half cross section, of a gas turbine engine employing an exemplary embodiment of the mixing structure and flameholder arrangement of the present invention.

Referring now to FIG. 1 of the drawings, there is shown a gas turbine engine 10 which includes a core engine 12 for generating an annular hot gas stream; a low pressure turbine 14, downstream of the core engine; and a fan 16 which is operatively connected to the turbine 14 for pressurizing flow through an annular duct or passage 18. The core engine has been shown as comprising a compressor 20, a combustor 22 and a high pressure turbine 24 arranged in serial flow relationship along an annular flow passage 26. The duct 18 is cooperatively defined by an outer casing 28 and a core engine casing or support structure 30.

A convoluted annular mixer has been shown at 32 for receiving and efficiently mixing the hot gas and fan streams in an afterburner portion 34, prior to discharge of the streams through engine nozzle 36.

As best shown in FIGS. 3 through 6, the mixer 32 is of the type defining an annular array of alternating first and second chutes, 38 and 40, which communicate at their upstream ends, respectively, with the annular core engine flow passage 26 and the annular fan duct 18. In accordance with the present invention, the mixer 32 includes means for selectively communicating the downstream first and second chutes with alternate ones of the upstream first and second chutes whereby the temperature of the downstream mixer portion defining such downstream chutes and, hence, the emitted infrared radiation therefrom may be selectively reduced.

In one form, the mixer 32 includes axially spaced upstream and downstream mixer portions 42 and 44, and means 46 to selectively divert the stream efflux from the upstream first and second chutes to selective ones of the downstream first and second chutes.

Each mixer portion comprises a plurality of peripherally spaced, generally radially and axially extending sidewalls 48. The sidewalls 48 are alternately connected by outer walls 50, which, in the case of the upstream mixer portion 42, are formed as a generally streamline continuation of the outer boundary of the annular core engine flow passage 26, and inner wall members 52, which, in the case of the upstream mixer portion 42, are formed as a, generally streamline continuation of the inner surface of the fan duct 18.

The first chutes are defined internally of outer walls 50, and connected sidewalls 48 while the second chutes are formed by the inner wall 52 and connected sidewalls 48. It should be noted that the inner walls 52 of the downstream mixer portion 44 diverge or are flared outwardly in the downstream direction so as to define an annular air space 54, intermediate such walls and a centerbody member 56 carried by the core engine support structure, which communicates with the first chutes of the downstream mixer portion 44 and the afterburner 34.

Figure 2:
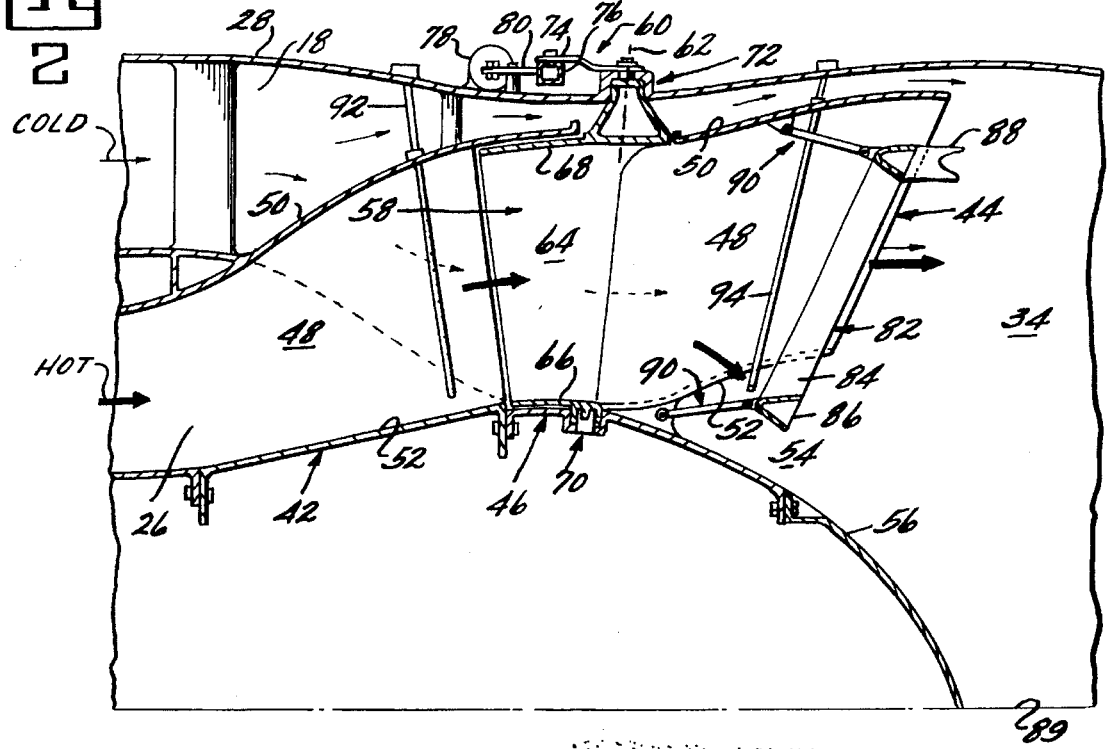
FIG. 2 is a half cross-sectional view, drawn to an enlarged scale, diagrammatically showing the mixer structure of FIG. 1.
Figure 3:
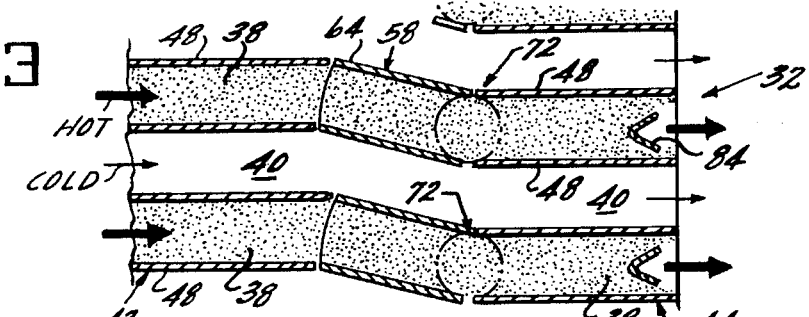
FIG. 3 is a partial cross-sectional view taken along line 3—3 of FIG. 2 and schematically showing the mixer in its first position.
Figure 4:
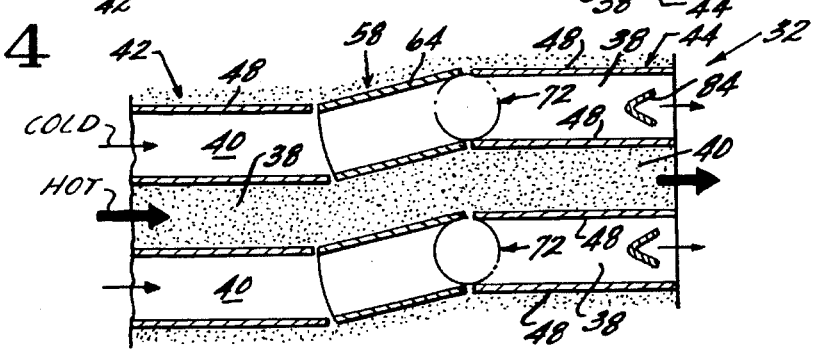
FIG. 4 is a partial cross-sectional view, like FIG. 3, schematically showing the mixer in its second position.

The selective diverting means 46 has been shown in FIGS. 2 through 6 as comprising a plurality of pivotal flapper valves 58 together with means 60 for rotating the flapper valves about axes 62, which are generally radial of the engine 10, between a first position, as in FIGS. 3 and 5, and a second position, as in FIGS. 4 and 6. When in the first position, the flapper valves 58 communicate each upstream first chute 38 with a downstream first chute and each upstream second chute 40 with a downstream second chute. In the second position, the flapper valves 58 communicate each upstream first chute 38 with a second chute 40 of the downstream mixer portion 44 and each upstream second chute 40 with a downstream first chute 38.

As shown in FIGS. 2, 3 and 4, the flapper valves 58 may include generally radial wall members or flaps 64, corresponding to the wall members of the upstream and downstream mixer portions 42 and 44, and inner and outer wall members, 66 and 68, which connect the radially inner and outer ends of each peripherally adjacent pair of sidewalls or flaps 64 to form a generally rigid box structure which is suitably journaled for rotation about the axis 62, as at 70 and 72.

The means 60 for rotating each flapper valve 58 between its first and second position has been shown as comprising a crank arm 74 which is operatively connected to a unison ring 76. The unison ring 76 is rotatably driven by suitable means, such as a fluid actuator 78, through a bell crank 80.

While the flapper valves 58 have been described as comprising a generally: rigid box structure, including sidewalls or flaps 64 and inner and outer walls 66 and 68, it should be understood that the inner wall, the outer wall, or both, may be fixed and formed as a continuation of centerbody member 56 and outer walls 50, respectively, and that each flap 64 may be individually pivoted as shown in the embodiment of FIGS. 5 and 6.

In accordance with a further aspect of the present invention, flameholder means 82 are provided which comprise a plurality of generally radially extending V-gutters 84 which are connected at their inner and outer ends to an inner annular V-gutter 86 and an outer annular V-gutter 88. The flameholder means 82 is suitably connected to the downstream mixer portion 44 by articulated connecting means 90 which accommodate thermal expansion and contract ion of the flameholder means 82 while maintaining the annular V-gutters 86 and 88 generally concentric relative to the engine longitudinal axis 89.

As best shown in FIGS. 3 through 6, the radial V-gutters 84 are disposed within only the first chutes 38 of the downstream mixer portion 44 while the inner annular V-gutter 86 is positioned radially inwardly of the inner walls 52 of downstream mixer portion 44 and within the annular air space 54. In this manner, with the exception of a small portion of the outer annular V-gutter 88, substantially all of the flameholder means 82 is bathed in the hot gas stream when the means 46 is disposed in its first position, and in the relatively cool fan stream when the means 46 is disposed in its second position.

Fuel may be introduced into the afterburner 34 by providing suitable spraybars 92 Which are connected to a source of pressurized fuel and extend radially inwardly through the outer casing 28 and the outer wall 50 of the upstream mixer portion 42 and into each first chute 38. Suitable lightoff means shown generally at 94 may be provided to provide ignition in the afterburner.

For reasons of improved mixing, the downstream mixer portion is preferably adapted to accelerate the stream flow into the afterburner 34 and, to this end and as shown in FIGS. 5 and 6, adjacent sidewalls 48, which define the second chutes 40, may be convergent toward their downstream end so as to form a nozzle for each second chute 40 and, at the same time and in cooperation with each radial V-gutter 84, define a nozzle for each first chute 38.

As best shown in FIGS. 5 and 6, alternate ones of the flaps 64 may be arranged so as to define a radial space or gap 96, when disposed in the second position and in cooperation with their associated upstream mixer sidewall 48, by projecting at their upstream end into the second chutes 40, whereby a portion of the relatively cool air effluxing from each upstream second chute 40 is directed into a downstream second chute 40 to dilute the hot gas stream flowing therethrough and further reduce temperatures and emitted radiation from the downstream. mixer portion 44.

To shield the relatively hot upstream mixer portion 42 and the low pressure turbine 14 from a direct line of sight through the engine nozzle 36, the sidewalls 48 and hence the chutes 38 and 40 are preferably skewed, as shown in FIGS. 5 and 6, at a suitable angle relative to the engine longitudinal axis 89. This skewing angle is preferably selected to approximate the efflux swirl angle from the low pressure turbine 14 so as to minimize flow losses. Where such skewing is employed and with continued reference to FIGS. 5 and 6, the outlet of each downstream chute 38, 40 is preferably formed to efflux the streams in an axial direction to promote efficient flow through the afterburner 34.

The use, operation and function of the present invention are as follows:

During unaugmented and augmented operation of the engine 10, the means 46 is normally disposed in its first position of FIGS. 3 and 5, wherein the hot gas stream effluxing from the annular core engine passage 26 is directed into the afterburner 34 through the first chutes 38 of the upstream and downstream mixer portions 42 and 44.

When it is desired to reduce the level of emitted infrared radiation from the engine nozzle 36, the means 46 is pivoted about axes 62 by means 60 to its second position of FIGS. 4 and 6, wherein the hot gas stream effluxing from the first chutes of the upstream mixer portion 42 is now directed by means 46 to the downstream second chutes 40, while the cold stream effluxing from the upstream second chutes 40 is diverted to the downstream first chutes 38. In this manner, the chute defining wall surfaces of the downstream mixer portion 44, which had previously been exposed to the high temperature hot gas stream, are bathed in the relatively cool fan stream and are rapidly reduced in temperature. At the same time, a portion of the cold fan stream efflux may be directed through radial passages 96, as in FIG. 6, and into the second chutes 40 of the downstream mixer portion so as to dilute and reduce the temperature of the hot gas stream passing therethrough.

Since the flameholder means 82 is substantially entirely exposed to the flow through the first chutes 38 of the downstream mixer portion, when the means 46 is disposed in its second or low infrared radiation position, the flameholder means is. rapidly cooled to further reduce the emitted infrared radiation level.

From the foregoing, it will be appreciated that the present invention provides efficient means for mixing the hot gas and fan streams of a gas turbine engine together with means for selectively communicating the downstream chutes of such mixer with alternate ones of the upstream mixer chutes so as to enable selective reduction of mixer temperatures and emitted infrared radiation.

While several embodiments have been depicted and described, it will be appreciated by those skilled in the art that many substitutions, variations and modifications may be made thereto without departing from the fundamental theme of the invention.

What is claimed is:

1. A gas turbine engine including, in combination, a core engine including a compressor, a combustor and a first turbine arranged in serial flow relationship for generating a hot gas stream, a second turbine downstream of said first turbine, a duct, a fan upstream of said compressor and operatively connected to said second turbine for pressurizing a stream of air in said duct, means for mixing at least a portion of said fan stream and said hot gas stream, nozzle means downstream of said mixing means for discharging said mixed streams to provide propulsive thrust for said engine, said mixing means including upstream and downstream portions axially spaced apart and defining an annular array of alternating first and second chutes, said upstream first and second chutes adapted to receive, respectively, said hot gas stream and said fan stream, and means for selectively communicating said downstream first and second chutes with alternate ones of said upstream first and second chutes disposed between said mixer portions and comprising means to divert the stream efflux from each upstream chute to selective ones of the downstream chutes, whereby the temperature of the downstream mixer portion and, hence, emitted infrared radiation therefrom may be selectively reduced.

2. A convoluted annular mixer for use in mixing the hot gas and fan streams of a gas turbine engine, said mixer of the type defining an annular array of generally radially and axially elongated first and second chutes having upstream and downstream portions, said upstream and downstream mixer portions being axially spaced apart, said upstream first chute portions adapted to receive said hot gas stream and said upstream second chute portions adapted to receive said fan stream, sand means for selective communicating said downstream first and second chute portions including flapper valve means disposed between said mixer portions, whereby the temperature of the downstream portion of said mixer and, hence, emitted infrared radiation therefrom may be selectively reduced.

3. The structure of claim 2 further characterized in that each said mixer portion comprises a corresponding number of peripherally spaced, generally radially and axially extending sidewalls, inner and outer wall members connecting peripherally alternate ones of said sidewalls at their radially inner and outer ends, said flapper valve means including a flap corresponding to each upstream mixer sidewall which is pivoted about a generally radial axis together with means for rotating each said flap between a first position, wherein the upstream first and second chutes communicate, respectively, with the downstream first and second chutes, and a second position wherein the upstream first and second chutes communicate, respectively, with the downstream second and first chutes.

4. The structure of claim 3 further characterized in that peripherally adjacent pairs of flaps are connected by radially inner and outer wall members to define a generally rigid box structure.

5. The structure of claim 3 further characterized in that said rotating means comprise a unison ring, actuator means in driving connection with said unison ring, and a plurality of crank arms operatively connected between said flaps and said unison ring.

6. The structure of claim 3 further characterized by and including flameholder means carried by the downstream mixer portion and including a generally radially extending V-gutter disposed within the downstream end of each downstream first chute.

7. The structure of claim 6 further characterized in that the radial sidewalls defining each downstream first chute are flared to the downstream end of the lobe so as to define a convergent outlet for each said downstream second chute and an outlet of reduced cross-sectional flow area, in cooperation with said V-gutters, for said downstream first chutes.

8. The structure of claim 6 further characterized in that said V-gutters extend radially inwardly of the radially inner wall members of said downstream portion, said flameholder further including inner and outer annular V-gutters connected to said radial V-gutters.

\* \* \* \* \*